United States Patent
Zheng et al.

(10) Patent No.: US 7,839,661 B2
(45) Date of Patent: Nov. 23, 2010

(54) POWER SUPPLY CONTROL CIRCUIT HAVING CONTROLLABLE SWITCH AND LIQUID CRYSTAL DISPLAY USING THE SAME

(75) Inventors: Jie-Jian Zheng, Shenzhen (CN); Tong Zhou, Shenzhen (CN); Jian-Hui Lu, Shenzhen (CN); Hua Xiao, Shenzhen (CN); Kun Le, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 381 days.

(21) Appl. No.: 12/011,977

(22) Filed: Jan. 29, 2008

(65) Prior Publication Data

US 2008/0180977 A1    Jul. 31, 2008

(30) Foreign Application Priority Data

Jan. 29, 2007 (TW) .............................. 96103221 A

(51) Int. Cl.
*H02M 3/335* (2006.01)
(52) U.S. Cl. .......................................... 363/20; 363/97
(58) Field of Classification Search ............. 363/17–20, 363/21.01, 95, 97; 307/43, 45, 126, 140, 307/141, 66; 713/310, 330, 340
See application file for complete search history.

(56) References Cited

U.S. PATENT DOCUMENTS

| | | | | |
|---|---|---|---|---|
| 5,774,039 | A | * | 6/1998 | Housley .................... 340/326 |
| 5,917,716 | A | | 6/1999 | Cho |
| 5,920,466 | A | * | 7/1999 | Hirahara .................. 363/21.02 |
| 6,969,927 | B1 | | 11/2005 | Lee |

FOREIGN PATENT DOCUMENTS

CN        2909698 Y    6/2007

* cited by examiner

*Primary Examiner*—Rajnikant B Patel
(74) *Attorney, Agent, or Firm*—Wei Te Chung

(57) ABSTRACT

An exemplary power supply control circuit (200) includes a first port (201), a second port (202), a third port (203), a controllable switch (280), and a control circuit (270). The first and second ports are configured to receive a power supply voltage signal. The second and third ports are configured to output the power supply voltage signal to a load circuit. The controllable switch includes a control member (281) and a switch member (282). The control circuit is configured to control a working state of the control member. When the load circuit stops working, the control circuit controls the control member to control the switch member to be disconnected, so as to cut off the power supply voltage signal from outputting to the load circuit. A liquid crystal display (400) using the power supply control circuit is also provided.

20 Claims, 1 Drawing Sheet

POWER SUPPLY CONTROL CIRCUIT HAVING CONTROLLABLE SWITCH AND LIQUID CRYSTAL DISPLAY USING THE SAME

FIELD OF THE INVENTION

The present invention relates to power supply control circuits, and more particularly to a power supply control circuit having a controllable switch to cut off a power supply signal. The power supply control circuit may be used in a liquid crystal display.

GENERAL BACKGROUND

Generally, an electronic product such as a liquid crystal display receives an alternating current (AC) voltage from a commercial power outlet via a power supply line. The AC voltage serves as a power supply signal to enable the electronic product to work. A power control key is usually employed in the electronic product to control a working state thereof. When the electronic product is turned off, the power supply line is not necessary to be pulled out from the commercial power outlet, a user merely needs to press down the power control key conveniently.

Take a conventional liquid crystal display as an example. The liquid crystal display includes a power control key and a controller. The controller can be a scaler having a control terminal, and the control terminal is grounded via the power control key. When the electronic product is turned off, the power control key is pressed down. This causes two ends of the power control key to be connected, and an electrical potential of the control terminal of the controller is pulled down. Detecting that the electrical potential of the control terminal is pulled down, the scaler controls driving circuits of a liquid crystal panel and an inverter circuit of a backlight system of the liquid crystal display to stop working. In this situation, the liquid crystal display is turned off.

However, because the power supply line of the liquid crystal display still remain being electrically coupled to the commercial power outlet, the power supply signal provided to the liquid crystal display is not cut off completely. This causes interface circuits of the liquid crystal display are still at work. The liquid crystal display may take power consumption about 0.1 W (watts) to 3 W all the same after being turned off via the power control key. Therefore, power waste is induced, and the power waste becomes serious particularly when the liquid crystal display maintains such a turn-off state for a long time. Accordingly power utilization efficiency of the liquid crystal display is low.

It is, therefore, desired to provide a power supply control circuit which overcomes the above-described deficiencies, and a liquid crystal display using such power supply control circuit.

SUMMARY

In a first aspect, a power supply control circuit includes a first port, a second port, a third port, a controllable switch, and a control circuit. The first port and the second port are configured to receive a power supply voltage signal from a power provider cooperatively. The second port and the third port are configured to output the power supply voltage signal to a load circuit cooperatively. The controllable switch includes a control member and a switch member. The control circuit is configured to control a working state of the control member. When the load circuit stops working, the control circuit controls the control member to be in a first working state, the control member controls the switch member to be disconnected, so as to cut off the power supply voltage signal from outputting to the load circuit via the power supply control circuit.

In a second aspect, a liquid crystal display includes a liquid crystal module and a power supply control circuit. The power supply control circuit includes a first port, a second port, a third port, a controllable switch, and a control circuit. The first port and the second port are electrically coupled to a live line and a neutral line of a commercial power outlet respectively. The third port and the second port are electrically coupled to the liquid crystal module. The controllable switch comprises a control member and a switch member, the control circuit is configured to control a working state of the control member. When the liquid crystal display is turned off, the control circuit controls the control member to switch the switch member off, so as to cut off a power supply voltage signal providing by the commercial power outlet from outputting to the liquid crystal module.

Other novel features and advantages will become more apparent from the following detailed description when taken in conjunction with the accompanying drawings.

DETAILED DESCRIPTION OF PREFERRED EMBODIMENTS

Reference will now be made to the drawings to describe a preferred and exemplary embodiment of the present invention in detail.

Figure 1:
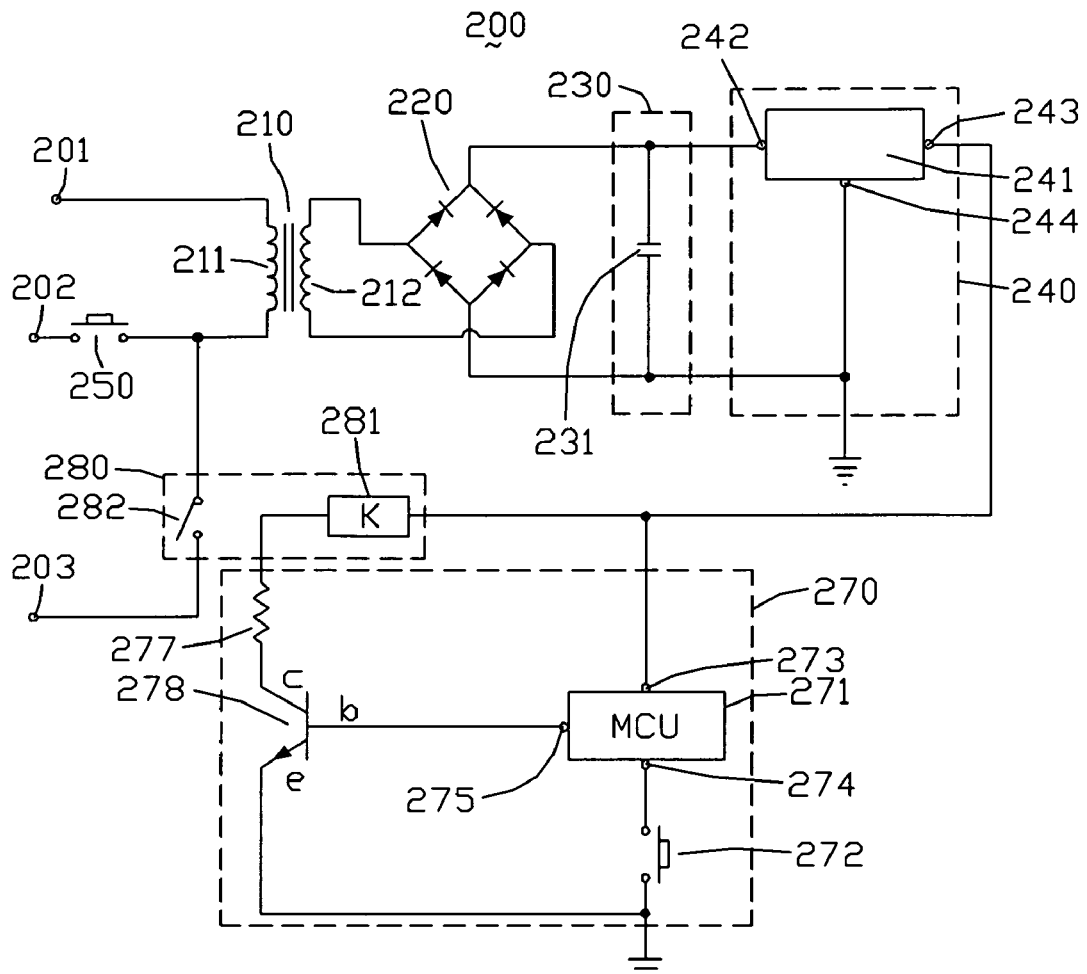
FIG. 1 is a circuit diagram of a power supply control circuit according to an exemplary embodiment of the present invention.
Figure 2:
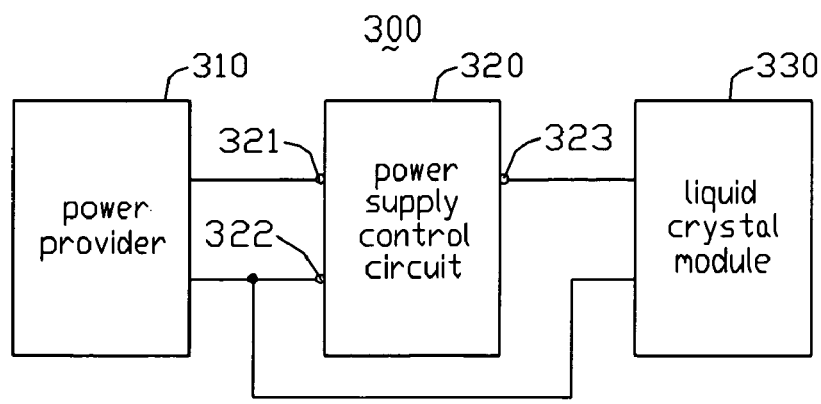
FIG. 2 is a block diagram of a liquid crystal display using the power supply control circuit of FIG. 1.

FIG. 1 is a circuit diagram of a power supply control circuit according to an exemplary embodiment of the present invention. The power supply control circuit 200 includes a first port 201, a second port 202, a third port 203, a transformer 210, a rectifying circuit 220, a filter circuit 230, a voltage stabilizing circuit 240, a switch key 250, a control circuit 270, and an electromagnetic switch 280.

The first port 201 and the second port 202 are respectively electrically coupled to a live line and a neutral live of a commercial power outlet via power supply lines, and are configured to receive an alternating current (AC) voltage signal from the commercial power outlet. The second port 202 and the third port 203 are electrically coupled to a load circuit (not shown) of the power supply control circuit 200. The load circuit can for example be a display module of a liquid crystal display.

The transformer 210, the rectifying circuit 220, the filter circuit 230, and the voltage circuit 240 cooperatively form a voltage converting circuit (not labeled), which is configured to convert the AC voltage signal to a stable direct current (DC) voltage signal. The transformer 210 is configured to adjust amplitude of the AC voltage signal, and includes a primary coil 211 and a secondary coil 212. One end of the primary coil 211 serves as a first input terminal of the voltage converting circuit, and is electrically coupled to the first port 201. The other end of the primary coil 211 serves as a second input terminal of the voltage converting circuit, and is electrically coupled to the second port 202 via the switch key 250. The secondary coil 212 is electrically coupled to the rectifying circuit 220.

The rectifying circuit 220 includes a full-wave rectifier, and the full-wave rectifier can be a bridge type rectifier. The rectifying circuit 220 is configured to convert the AC voltage signal outputted by the transformer 210 to be a DC voltage signal.

The filter circuit 230 includes a filter capacitor 231. The filter capacitor 231 is configured to filter the DC voltage signal outputted by the rectifying circuit 220. Each ends of the filter capacitor 231 is electrically couple to a respective output terminal (not labeled) of the rectifying circuit 220.

The voltage stabilizing circuit 240 is configured to stabilize a value of the DC voltage signal that is filtered by the filter circuit 230. The voltage stabilizing circuit 240 includes a voltage stabilizer 241. The voltage stabilizer 241 can be a three-terminals integrated voltage stabilizer, and includes an input terminal 242, an output terminal 243, and a common terminal 244. The input terminal 242 and the common terminal 244 are electrically coupled to a respective end of the filter capacitor 231, and the common terminal 244 is grounded. The output terminal 243 serves as an output terminal of the voltage converting circuit, and is configured to output the DC voltage signal being stabilized by the voltage stabilizer 241 to the control circuit 270 and the electromagnetic switch 280.

The electromagnetic switch 280 is a relay, and includes a control coil 281 and a relay contact switch 282. The control coil 281 is electrically coupled between the control circuit 270 and the output terminal 243 of the voltage stabilizing circuit 240. The relay contact switch 282 is electrically coupled between the third port 203 and a node between the switch key 250 and the primary coil 211 of the transformer 210. Moreover, the relay contact switch 282 is a normal open type switch, that is, the relay contact switch 282 is in an off state normally. The relay contact switch 282 can be switched to an on state only if an enabling current signal is provided to the control coil 281.

The control circuit 270 includes a micro control unit (MCU) 271, a control key 272, a transistor 278, and a resistor 277. The MCU 271 includes a first input terminal 273, a second input terminal 274, and an output terminal 275. The first input terminal 273 is configured to receive the DC voltage signal from the output terminal 243 of the voltage stabilizing circuit 240. The second input terminal 274 is grounded via the control switch 272. The output terminal 275 is configured to output a control signal to control a working state of the transistor 278. The transistor 278 serves as an electronic switch, and can be a negative-positive-negative bipolar junction transistor (NPN BJT). A base electrode of the transistor 278 is electrically coupled to the output terminal 275 of the MCU 271. A collector electrode of the transistor 278 is electrically coupled to the control coil 281 via the resistor 277. An emitter electrode of the transistor 278 is grounded. Moreover, the control key 272 is also a normal open type key.

When the power supply control circuit 200 is employed in an electronic product, it can be used to turn on and turn off the electronic product. Details of operations of the power supply control circuit 200 are as follows.

When the electronic product is turned on, the switch key 250 is pressed down manually by a user and switched on. Thereby, an AC voltage signal from the commercial power outlet is received by the transformer 210. The AC voltage signal is adjusted by the transformer 210, rectified by the rectifying circuit 220, filtered by the filter circuit 230, and then stabilized by the voltage, such that the AC voltage signal is converted to a stable DC voltage signal. Due to the DC voltage signal, the MCU is enabled and outputs a first control signal to the transistor 278. The first control signal is a high voltage signal, which switches the transistor 278 on. Thereby a current path is formed between the output terminal 243 and the ground, such that an enabling current signal is provided to the control coil 281 and causes the control coil 281 to generate a magnetic field. The magnetic field forces the relay contact switch 282 to be switched on.

In this situation, the third port 203 is electrically coupled to the first port 201 via the primary coil 211. Thus the AC voltage signal from the commercial power outlet is outputted to the load circuit via the third port 203 and the second port 202, and the electronic product is turned on and enabled to work. Moreover, once the relay contact switch 282 is switched on, the switch key 250 is released and switched off. The period between the key switch 250 being pressed down and being released is only a short period, such short period satisfies a normal key-pressing habit of the user.

When the electronic product is turned off, the control key 272 is pressed down, such that the second input terminal 274 of the MCU 271 is grounded. Thus the electrical potential of the second input terminal 274 is pulled down, that is, a low voltage signal is received by the second input terminal 274. Due to the low voltage signal, the MCU 271 outputs a second control signal to the transistor 278 via the output terminal 275 thereof. The second control signal is also a low voltage signal, which switches the transistor 278 off. Thereby, the enabling current signal is cut off, and the control coil 271 stops providing the magnetic field. Without being operation by the magnetic field, the relay contact switch 282 cannot remain being in the on state any longer, and turns to the normal off state. That is, two ends of the relay contact switch 282 become disconnected. Therefore, the third port 203 is cut off from the first port 201 completely via the relay contact switch 282, and the power supply signal is stopped being provided to the load circuit, so that the electronic product is turned off. Moreover, the control key 272 is released and switched off after the third port 203 is cut off.

The power supply control circuit 200 can also enable the electronic product to be turned off automatically. In particular, the MCU 271 can be programmed according to a requirement of the user, and the corresponding software program predetermines a working period of the electronic product. Once an inner trigger signal is generated in the MCU 271, the MCU 271 starts to count via a counter (not shown) disposed therein simultaneously. When the counting result reaches the predetermined working period, the MCU 271 outputs the second control signal via the output terminal 275 and causes the relay contact switch 282 to turn to the normal off state, such that the electronic product is turned off automatically. The trigger signal can be a self-generating signal of the MCU 271 generated as soon as the MCU 271 outputs the first control signal via the output signal 275 to enable the relay contact switch 282 to be switched on. Moreover, the trigger signal can also be generated when the electronic product is in a standby state for a predetermined time, thus by employing the power supply control circuit 200, the electronic product is capable of being turned off automatically when it is not under any operation for a long time.

The power supply control circuit 200 controls the working state of the electromagnetic switch 280 via the control circuit 270, such that when the control key 272 is pressed down, the third port 203 is cut off and disconnected from the first port 201 completely. Because the power supply control circuit 200 uses the third port 203 and the second port 202 to provide power supply to the load circuit, when the electronic product is turned off, it is cut off from the live line of the commercial power outlet completely. Thus power supply signal from the commercial power outlet cannot be provided to the electronic product, the entire electronic product (including the interface circuit thereof) stops working and does not consume any power. Therefore, the power supply control circuit 200 saves the unnecessary power that might otherwise be wasted by the electronic product, and accordingly the power utilization efficiency of the electronic product can be improved.

Moreover, in the power supply control circuit 200, the electromagnetic switch 280 can also be a controllable switch having a control member, and a switch member controlled by the control member. Whereby the control member and the switch member respectively corresponds to the control coil 281 and the relay contact switch 282, and when the switch member is switched off both ends thereof are disconnected completely. The transistor 278 can also be a metal-oxide-semiconductor field effect transistor (MOSFET), and a gate electrode, a source electrode, and a drain electrode of the MOSFET respectively correspond to the base electrode, the source electrode, and the collector electrode of the transistor 278. The MCU 271 can further include a feedback terminal to feed back a working state of the load circuit and carry out a function of overload protection, such that the MCU 271 automatically controls the power supply control circuit 200 to cut off the power supply signal if the load circuit is in an abnormal working state.

FIG. 3 is a block diagram of a liquid crystal display according to the present invention. The liquid crystal display 300 includes a power provider 310, a power supply control circuit 320, and a liquid crystal module 330. The power provider 310 is configured to provide a power supply signal for the liquid crystal display 300, and can be a commercial power outlet. The power supply control circuit 320 can be the above-described power supply control circuit 200, and includes a first port 321, a second port 322, and a third port 323. The first port 321 and the second port 322 are respectively coupled to a live line and a neutral line of the power provider 310. The third port 323 and the second port 322 are electrically coupled to the liquid crystal module 330. When the liquid crystal display 300 is turned off, the power supply control circuit 320 cuts off the liquid crystal module 330 from receiving the power supply signal from the live line of the commercial power outlet completely. Thus, the power supply signal cannot be provided to the liquid crystal module 330, and power waste can be saved by the liquid crystal display 300. Accordingly the power utilization efficiency of the liquid crystal display 300 is improved.

It is to be further understood that even though numerous characteristics and advantages of preferred and exemplary embodiments have been set out in the foregoing description, together with details of the structures and functions of the embodiments, the disclosure is illustrative only; and that changes may be made in detail within the principles of the present invention to the full extent indicated by the broad general meaning of the terms in which the appended claims are expressed.

What is claimed is:

1. A power supply control circuit, comprising:
   a first port;
   a second port, the first and second ports cooperatively configured to receive a power supply voltage signal from a power provider;
   a third port, the second and third ports cooperatively configured to output the power supply voltage signal to a load circuit;
   a controllable switch having a control member and a switch member,
   a control circuit configured to control a working state of the control member;
   wherein when the load circuit stops working, the control circuit controls the control member to be in a first working state, the control member controls the switch member to be disconnected, so as to cut off the power supply voltage signal from outputting to the load circuit.

2. The power supply control circuit as claimed in claim 1, wherein when the load circuit is in a normal working state, the control circuit controls the control member to be in a second working state, and the control member controls the switch member to be switched on.

3. The power supply control circuit as claimed in claim 1, wherein the controllable switch comprises an electromagnetic switch.

4. The power supply control circuit as claimed in claim 3, wherein the electromagnetic switch is a relay, the control member thereof is a control coil, and the switch member thereof is a relay contact switch.

5. A power supply control circuit, comprising:
   a first port;
   a second port, the first and second ports cooperatively configured to receive a power supply voltage signal from a power provider;
   a third port, the second and third ports cooperatively configured to output the power supply voltage signal to a load circuit;
   a controllable switch having a control member and a switch member,
   a control circuit configured to control a working state of the control member;
   wherein when the load circuit stops working, the control circuit controls the control member to be in a first working state, the control member controls the switch member to be disconnected, so as to cut off the power supply voltage signal from outputting to the load circuit;
   wherein the control circuit comprises a controller and an electronic switch, the control member is grounded via the electronic switch, the controller is configured to control a working state of the electronic switch;
   wherein the control circuit further comprises a control key, the controller is grounded via the control key.

6. The power supply control circuit as claimed in claim 5, wherein the electronic switch is a bipolar junction transistor, a base electrode of the transistor is electrically coupled to the controller, an emitter electrode of the transistor is grounded, and a collector electrode of the transistor is electrically coupled to the control member of the controllable switch.

7. The power supply control circuit as claimed in claim 5, wherein the electronic switch is a metal-oxide-semiconductor filed effect transistor, a gate electrode of the transistor is electrically coupled to the controller, a source electrode of the transistor is grounded, and a drain electrode of the transistor is electrically coupled to the control member of the controllable switch.

8. The power supply control circuit as claimed in claim 2, further comprising a voltage converting circuit, the voltage converting circuit is configured to convert the power supply voltage signal to a desired direct current voltage signal, and the direct current voltage signal is configured to provide an enabling current to the control member when the control member is in the second working state.

9. The power supply control circuit as claimed in claim 8, wherein the voltage converting circuit comprises a first input terminal and a second input terminal, the first input terminal is electrically coupled to the first port, and the second input terminal is electrically coupled to the second port via a switch key.

10. The power supply control circuit as claimed in claim 9, wherein the switch member of the controllable switch is electrically coupled between the third port and the second input terminal of the voltage converting circuit.

11. The power supply control circuit as claimed in claim 9, wherein the voltage converting circuit further comprises an output terminal, the output terminal is electrically coupled to both the control member of the controllable switch and the control circuit.

12. The power supply control circuit as claimed in claim 10, wherein the voltage converting circuit further comprises a transformer, the transformer comprises a primary coil, two ends of the primary coil respectively serves as the first input terminal and the second input terminal of the voltage converting circuit.

13. The power supply control circuit as claimed in claim 11, wherein the voltage converting circuit further comprises a rectifying circuit, a filter circuit, and a voltage stabilizing circuit electrically coupled to the transformer sequentially.

14. A liquid crystal display, comprising:
   a liquid crystal module; and
   a power supply control circuit comprising a first port, a second port, a third port, a controllable switch, and a control circuit;
   wherein the first port and the second port are electrically coupled to a live line and a neutral line of a commercial power outlet respectively, the third port and the second port are electrically coupled to the liquid crystal module;
   the controllable switch comprises a control member and a switch member, the control circuit is configured to control a working state of the control member, the control circuit comprises a controller, an electronic switch, and a control key, the control member is grounded via the electronic switch, the controller is grounded via the control key, and is configured to control a working state of the electronic switch;
   when the liquid crystal display is turned off, the control circuit controls the control member to switch the switch member off, so as to cut off a power supply voltage signal providing by the commercial power outlet from outputting to the liquid crystal module.

15. The liquid crystal display as claimed in claim 14, wherein the power supply control circuit further comprises a switch key electrically coupled between the second port and the switch member of the controllable switch, the switch key is configured to turn on the liquid crystal display.

16. The liquid crystal display as claimed in claim 15, wherein when the liquid crystal display is turned on, the switch key is switched on, and the control member controls the switch member to be switched on.

17. The liquid crystal display circuit as claimed in claim 15, wherein the controllable switch comprises an electromagnetic switch having a control coil and a relay contact switch, the control coil and the relay contact switch respectively correspond to the control member and the switch member.

18. The liquid crystal display circuit as claimed in claim 13, wherein the control circuit comprises a controller and an electronic switch, the control member is grounded via the electronic switch, the controller is configured to control a working state of the electronic switch.

19. The liquid crystal display circuit as claimed in claim 18, wherein the control circuit further comprises a control key, the control key is configured to control the controller to output a corresponding signal.

20. The power supply control circuit of claim 1, wherein the control circuit comprises a controller and a control key, the controller is configured to control a working state of the control member of the controllable switch, and is grounded via the control key.

* * * * *